US012319488B2

(12) United States Patent
Fowler et al.

(10) Patent No.: US 12,319,488 B2
(45) Date of Patent: Jun. 3, 2025

(54) THERMALLY INSULATED TRANSPORT CONTAINER

(71) Applicant: Gobi Technologies Inc., Kirkland, WA (US)

(72) Inventors: Lawrence Morgan Fowler, Kirkland, WA (US); Peter Maier-Laxhuber, Pfaffenhofen an der Ilm (DE); Ralf Schmidt, Freising (DE); William Randal Sims, Nashville, TN (US)

(73) Assignee: Gobi Technologies Inc., Kirkland, WA (US)

( * ) Notice: Subject to any disclaimer, the term of this patent is extended or adjusted under 35 U.S.C. 154(b) by 336 days.

(21) Appl. No.: 17/690,982

(22) Filed: Mar. 9, 2022

(65) Prior Publication Data

US 2023/0286727 A1    Sep. 14, 2023

(51) Int. Cl.
| B65D 81/00 | (2006.01) |
| B65D 81/20 | (2006.01) |
| B65D 81/38 | (2006.01) |
| B65D 85/00 | (2006.01) |

(52) U.S. Cl.
CPC ..... *B65D 81/3809* (2013.01); *B65D 81/2015* (2013.01); *B65D 81/3811* (2013.01); *B65D 85/00* (2013.01); *B65D 2585/88* (2013.01)

(58) Field of Classification Search
CPC ..... F25D 3/08; F25D 2303/085; B65D 81/18; A61J 1/165; A01N 1/0273
See application file for complete search history.

(56) References Cited

U.S. PATENT DOCUMENTS

| 3,268,199 A | 8/1966 | Kordyban et al. |
| 5,769,262 A | 6/1998 | Yamada et al. |
| 2003/0146224 A1* | 8/2003 | Fujii ..................... A47J 41/022 |
| | | 220/592.27 |

(Continued)

FOREIGN PATENT DOCUMENTS

WO    2020260720 A1    12/2020

OTHER PUBLICATIONS

International Search Report and Written Opinion for Application No. PCT/US2023/61915, mailed Jun. 7, 2023, filed Feb. 3, 2023, 15 pages.

*Primary Examiner* — Eric S Ruppert
(74) *Attorney, Agent, or Firm* — George C. Rondeau, Jr.; Davis Wright Tremaine LLP

(57) ABSTRACT

A thermally insulated transport container for use with an ice battery, having an internal usable volume for freeze-free cooling of temperature-sensitive products placed therein, the usable volume having an outward usable volume portion, an internal cold storage volume sized to receive the ice battery, the cold storage volume having an inward cold storage volume portion adjacent to the outward usable volume portion to define a common interface of the usable volume and the cold storage volume, a heat-conducting liner extending about the usable volume and having a heat-conducting liner portion located between the outward usable volume portion and the inward cold storage volume portion, and a phase change material (PCM) container positioned adjacent to the heat-conducting liner portion at the common interface and in heat-conducting contact with the heat conduction liner portion, the PCM container sized to contain a phase change material.

19 Claims, 5 Drawing Sheets

(56) References Cited

U.S. PATENT DOCUMENTS

| | | | |
|---|---|---|---|
| 2004/0133251 A1* | 7/2004 | Altshuler | A61K 41/0057 |
| | | | 607/88 |
| 2012/0305435 A1* | 12/2012 | Matta | F25D 3/06 |
| | | | 206/521 |
| 2012/0325826 A1 | 12/2012 | McCormick | |
| 2013/0255824 A1 | 10/2013 | Williams et al. | |
| 2014/0174692 A1* | 6/2014 | Emond | F28F 13/00 |
| | | | 165/47 |
| 2018/0035337 A1 | 2/2018 | Kitazoe et al. | |
| 2018/0036202 A1 | 2/2018 | Wengreen et al. | |
| 2018/0252466 A1* | 9/2018 | Baker | B01L 7/52 |
| 2018/0266746 A1* | 9/2018 | Urayama | C09K 5/063 |
| 2018/0353379 A1 | 12/2018 | Chou et al. | |
| 2020/0231362 A1 | 7/2020 | Kulangara et al. | |
| 2021/0053725 A1 | 2/2021 | Barefoot et al. | |
| 2021/0139225 A1 | 5/2021 | Morine et al. | |
| 2023/0408162 A1* | 12/2023 | Sawafta | F25D 3/08 |

\* cited by examiner

THERMALLY INSULATED TRANSPORT CONTAINER

BACKGROUND OF THE INVENTION

Field of the Invention

The present invention relates to a thermally insulated transport container whose usable volume remains freeze-free even if the ice batteries used for cooling are used with a very low initial temperature.

Description of the Related Art

Freeze-free transport containers are certified by the WHO/UNICEF in CODE PQS E004 and are intended, for example, for the transport and storage of freeze-sensitive drugs and vaccines. U.S. published patent application US 2018/0353379 describes advantageous solutions for this transport task. Usual transport containers preferably have a usable volume between 0.5 and 1.7 liters, which is cooled by means of special ice packs known as batteries. The ice batteries that can be used for this purpose are also specified in more detail by the WHO/UNICEF in CODE PQS E005. Commercially available transport containers typically require 3 to 4 such ice batteries for cooling in order to keep the usable volume in a temperature range between 0° C. and 10° C. for the required cooling period. At an ambient temperature of 43° C., the cooling effect must last for more than 30 hours. The frozen ice batteries can be removed directly from the freezer and placed in transport containers advertised as "Freeze Free." The usable volume must not drop in temperature below 0° C. at any time, not even if ice batteries at −30° C. are placed in a transport container that is only at 15° C. Some existing transport containers solve this task with an intermediate layer made of a phase change material (PCM) through which the heat must flow from the usable volume to the ice batteries. PCMs typically used have a phase transition, also known as melting point, from liquid to solid at 4° C. to 6° C. At this melting temperature, the liquid PCM gives off heat to the frozen ice battery until it is heated to its own melting temperature of 0° C. At the end of the cooling period, when all the ice in the ice battery has melted, the PCM can thaw itself again and absorb heat from the usable volume at the PCM melting temperature.

Conventional transport containers typically advertise a cold life of approximately 30 to 35 hours and use 4 ice batteries and 4 PCM containers to protect the usable volume from freezing. The ice batteries are advantageously inserted from 4 sides around the usable volume, which is usually cubic. The PCM containers are each arranged between the ice batteries and the usable volume. Foam insulation with a thickness of approximately 40 to 50 mm insulates from the outside. The total weight of conventional "Freeze Free" transport containers is between 6 and 8 kg. The external volume is usually from 27 to 42 liters, while the usable volume is usually between 1.0 and 1.7 liters. The ice batteries with temperatures down to −30° C. are typically inserted into designated recesses, but it usually takes at least 2 hours for the usable volume to cool down to below 10° C. at an ambient temperature of 43° C.

BRIEF DESCRIPTION OF THE SEVERAL VIEWS OF THE DRAWING(S)

DETAILED DESCRIPTION OF THE INVENTION

Figure 1:
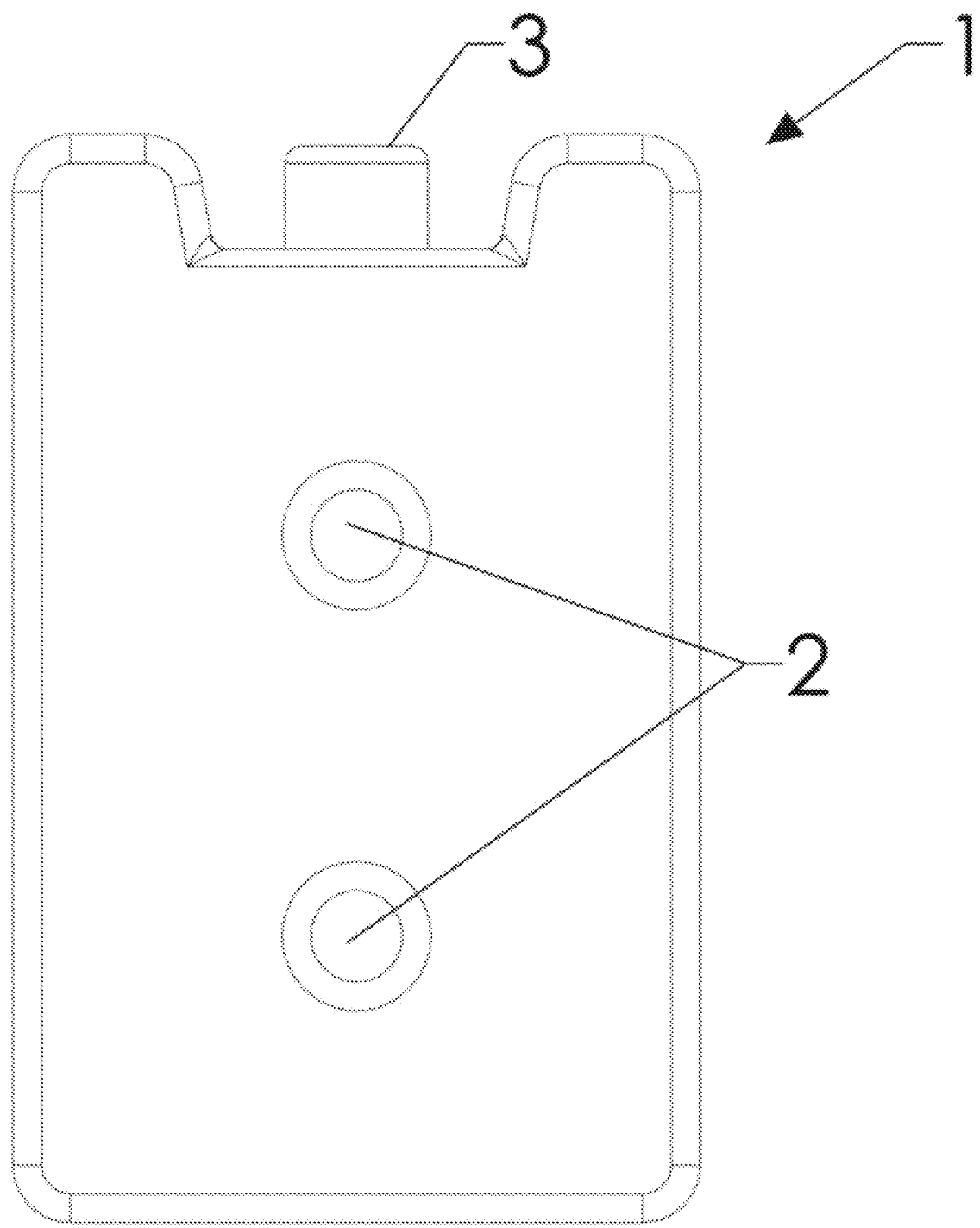
FIG. 1 is a schematic drawing of a conventional ice storage battery.

It is desirable to provide a thermally insulated "Freeze Free" transport container, in which the waiting time from the insertion of the ice batteries to the lowering of the temperature in the usable volume is shorter, and the total weight and the external volume are smaller than with conventional commercially available transport containers.

An exemplary transport container in accordance with the present invention preferably has a usable or useful volume for containing freeze-sensitive drugs and vaccines, or other materials and an adjacent cold storage volume with good thermal insulation. For example, the usable volume may be between 0.5 liters and 40 liters for a larger transport container. For a smaller transport container, the usable volume may be between 0.2 liters and 4 liters. Space in the cold storage volume is provided for insertion of at least one ice battery. The usable volume and cold storage volume have a common interface over which heat flows from the usable volume into the cold storage volume by means of a heat-conducting liner. The usable volume is in contact with the directly adjacent cold storage volume through a highly conductive heat-conducting liner. This liner can be made of aluminum sheet with thickness from 0.6 mm to 1 mm. In practice it is desirable to minimize the thickness required while still providing enough thermally conductive mass to transfer sufficient heat along the heat conducting liner.

The heat conducting liner conducts heat from the usable volume directly into the cold storage volume. At the interface of the two volumes there is also a PCM container with a phase change material (PCM) in extensive contact with the heat-conducting liner. The PCM container is arranged on the interface with the usable volume. In contrast to the conventional transport container, heat from the usable volume is transferred directly to the ice battery in the cold storage volume by means of the heat-conducting liner. The heat from the usable volume is not primarily directed through the PCM to the ice battery, but mainly through the heat-conducting liner directly to the ice battery. The conversion heat from the PCM container mainly serves to compensate for the sensible heat below the freezing point of the inserted ice battery. The amount of PCM in the PCM container depends primarily on the ice mass of the ice battery and the lowest possible working temperature of the freezer compartment in which the ice battery is usually frozen.

With an arrangement designed in this way, the exemplary transport container will achieve rapid cooling of the usable volume to the transition temperature of the PCM, since the entire interface to the cold storage volume is available for heat transfer to the ice battery. The heat-conducting liner quickly cools the usable volume as soon as the frozen ice battery is inserted into the cold storage volume, down to the conversion temperature of the PCM. However, further cooling is slowed down by the heat of conversion from the PCM. Only when the entire heat of conversion has been given off to the ice battery can the temperature in the usable volume drop further. At this point, however, the ice battery itself should be heated to its melting point. The temperature in the usable volume can thereafter no longer drop below 0° C.

It is therefore advantageous to measure the amount of conversion heat in the PCM container so that it is just sufficient to heat the ice battery from −30° C. to 0° C., for example. As soon as the ice battery itself begins to melt, its temperature remains at 0° C. in all areas. The temperature in the usable space will consequently drop to no more than 0° C. In practice it is always slightly higher, since the heat transport also requires a temperature difference.

The exemplary transport container leads to a more rapid cooling of the usable volume. For example, from an initial temperature of 43° C., the usable volume cools down to 10° C. in less than 50 minutes. Whereas, a conventional transport container takes about 2 hours and requires at least 3 or 4 ice batteries. With the exemplary transport container, the heat-conducting liner serves to transfer the heat from the usable volume to the ice battery. The heat-conducting liner also improves the heat distribution in the usable volume since it extends into the usable volume. In the exemplary transport container, a heat conducting liner along the outer surface of the cylindrical usable volume is used for this purpose. A calculation reveals that a cubic or cylindrical usable volume has to be cooled over significantly more than just a single ice battery surface. The conventional transport container uses 3 to 4 ice batteries. The exemplary transport container, on the other hand, uses the heat-conducting liner on the walls of the usable volume instead of additional ice batteries in order to keep the usable temperatures as homogeneous as possible.

The exemplary transport container not only allows faster cooling of the usable volume, towards the end of the cooling capacity, the ice battery itself has risen to the conversion temperature of the PCM. In this phase, the PCM itself melts by absorbing heat and thus keeps the usable volume close to its transition temperature for a longer period of time. As a result of the heat-conducting liner, both the PCM and the ice battery are discharged homogeneously, even if the heat penetrates the usable volume at different points in terms of time and quantity. This occurs regularly, for example, when the usable volume lid is opened and when vaccination vials that have been warmed up in the meantime are reinserted.

In the exemplary transport container, the heat-conducting liner can be formed from an aluminum sheet. The interface between the ice battery and the PCM container forms a flat piece of surface along the interface between the cold storage volume and the usable volume, while the extension into the usable volume runs along the cylindrical outer wall of the usable volume. It is sufficient to only line the vertical surfaces; the floor and ceiling of the usable volume can remain uncovered.

In the exemplary transport container, the outer insulation can be formed from a vacuum insulation vessel, foam, plastic, fabric, or any other material with a thermally insulating effect. Vacuum insulation has a significantly better insulation effect than foam insulation of the same thickness. Vacuum insulation vessels are usually made of glass or metal and usually have a cylindrical shape.

In the exemplary transport container, a vacuum insulation vessel is selected. A cylindrical geometry also requires an adapted usable volume and cold storage volume. However, the ice batteries certified by the WHO are cubic and have a precisely defined outer shape. The use of cubic ice batteries in cylindrical vacuum vessels leads to a loss of usable volume. The exemplary transport container reduces this disadvantage through the use of only a single ice battery, which rests with two adjacent outer edges on the inner cylinder of the vacuum vessel and with the opposite surface on a flat portion of the heat-conducting liner. The flat heat-conducting liner portion runs along a chord of the inner cylinder and further along the vertical lateral surface of the usable volume. In practice, a suitable shape in the heat-conducting liner creates a resilient restoring force that keeps the heat-conducting liner slidable by a few millimeters perpendicular to the interface. This has the advantage that bulging ice batteries can be inserted and, when the volume is subsequently reduced, the heat-conducting liner remains in good contact with the surface of the ice battery due to the restoring force created by the heat-conducting liner pressed against the inner wall of the vacuum insulation vessel. The geometry of the cold storage volume is thus specified. Also the optimal geometry of the usable volume therefore resembles a cylinder segment. The height of the usable volume follows the dimensions of the ice battery. In the exemplary transport container, the usable volume is approximately 1 cm higher than the ice battery, since an additional insulating plate is provided under the standing ice battery in order to avoid direct thermal contact with the curved base plate of the vacuum vessel. This insulating plate slows the transfer of heat from the useable volume to the ice battery so that the lower area of the usable volume does not get too cold.

Sometimes the restoring force created by the heat conducting liner pressed by the ice battery against the inner wall of the vacuum insulation vessel may not be sufficient to keep the ice battery in optimal thermal contact with the heat conducting liner. This may be caused by tolerances in the manufacturing processes or by deformation of the ice battery from the freezing of the ice. In this case, an additional restoring force may be applied, for example by means of a spring or level, to the outward side of the ice battery, thereby pushing the ice battery towards the heat conducting liner. This has the benefit of helping to maintain thermal contact between the ice battery and the heat conducting liner, and thereby decreasing the time to initially cool the usable volume.

The geometry of the PCM container also follows the advantageous cylinder geometry of the vacuum insulation vessel. For thermal engineering considerations, a uniform mass distribution on the interface is desirable. The PCM container runs along the cylinder chord from cylinder wall to cylinder wall and from the bottom of the vacuum vessel to the upper end of the interface. The PCM container thus protrudes on the side walls and on the bottom slightly beyond the dimensions of the ice battery up to the jacket of the insulating vessel. This design is advantageous for the temperature distribution in the usable volume.

In practice it has been shown that the transition point, or melting point, of the PCM is advantageously 5° C. This is not surprising, given that the required usable volume temperature is between 0° C. and 10° C. Numerous manufacturers offer PCM with a transformation point, also known as melting point, of between 4° C. and 6° C. in liquid/solid form but also embedded in various structural materials. Depending on the structural material and structural mass, this reduces the specific heat of conversion. Pure PCM, e.g. from Rubitherm Technologies with the designation RT5HC, achieves heat of fusion of 238 Joules per kilogram between 5° C. and 6° C. If the PCM mass used is to absorb the sensible heat of the ice battery from −30° C. to 0° C., a PCM mass of 0.25 kg per kilogram of ice battery must be planned. With an ice battery weighing 600 grams, this is 0.15 kg. In practice, any suitable PCM with a heat of fusion greater than 150 Joules per kilogram may be used. Currently there is no suitable PCM with a heat of fusion larger than 300 Joules per kilogram. In order to keep the PCM amount evenly available on the interface, it is recommended that the PCM liquid, filled in a container of suitable dimensions, be docked, or placed adjacent to, the heat-conducting liner with good thermal conductivity. In the exemplary transport container, the PCM container is docked on the side of the heat-conducting liner facing the usable volume. If the PCM container is arranged on the other side, i.e. on the side facing the ice battery, the usable volume would only cool down later and would react more slowly to changes in the ambient conditions. Since plastic and metal containers tend to bulge at the bottom during use and the PCM consequently accumulates at the bottom, the inside of the PCM container may be filled with an absorbent sponge or fleece in order to keep the liquid evenly distributed.

PCM containers made of flexible foils, which can be produced simply and quickly using generally known methods, are advantageous. PCM containers made from this are particularly flexible and can therefore be glued on easily and without gaps along the interface of the heat-conducting liner. If the PCM containers are under a slight vacuum, the PCM can be distributed extremely homogeneously in the inserted fleece material and the changes in volume at the transition point can be easily compensated. The disadvantage, however, is the thin and sensitive surface that faces the usable volume. An additional cover made of plastic or metal can be applied there. It is advantageous if an angled extension of the heat-conducting liner itself also covers and protects the flexible PCM container. It is particularly advantageous if the heat-conducting liner is formed in one piece from aluminum sheet and only fulfills all the required tasks by folding and rounding, and at the same time protects the flexible PCM container from sharp-edged objects in the usable volume.

Reference is now made to FIGS. 1-5 to more specifically describe the construction of an exemplary transport container TC.

It is first noted that the WHO certified ice storage battery 1, such as shown in FIG. 1, has a predetermined size and shape. It is preferred to adapt the size and shape of a cold storage volume 17 of the exemplary transport container TC shown in FIGS. 2 and 3 to the ice battery 1 as closely as possible. The shape of the usable volume 15 and the geometry of the heat-conducting liner 14 then result from the shape of the insulation chosen.

The ice battery 1 shown in FIG. 1 is a 0.6 liter ice battery for insulated transport containers in the geometry specified by the WHO in its code of practice CODE PQS E004. The WHO also specifies dimensions for a 0.3 liter and 0.4 liter ice batteries. The prescribed dimensions for the 0.6 liter ice battery 1 are 190 mm×122 mm×35 mm. The ice battery 1 has a sealable filling opening 3 and two features 2 for stiffening against the volume expansion during freezing. This means that the shape of the ice battery is largely retained when it is frozen. However, if the water filling freezes frequently, the ice battery will deviate more and more from its original shape. The cold storage volume space provided for holding the ice battery must take these deformations into account.

Figure 2:
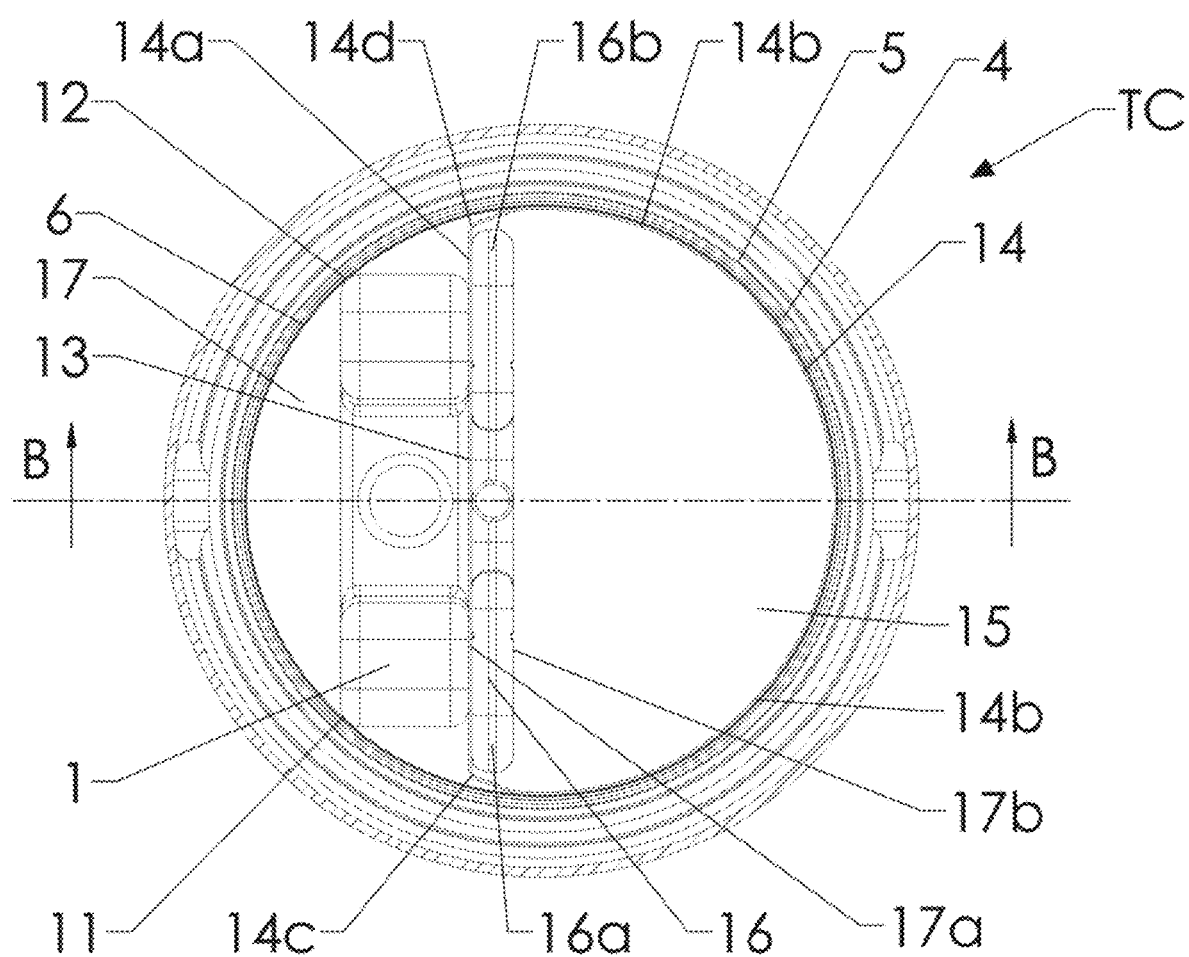
FIG. 2 is a schematic cross-sectional view of a thermally insulated transport container in accordance with the present invention taken substantially along line A-A of FIG. 3.
Figure 3:
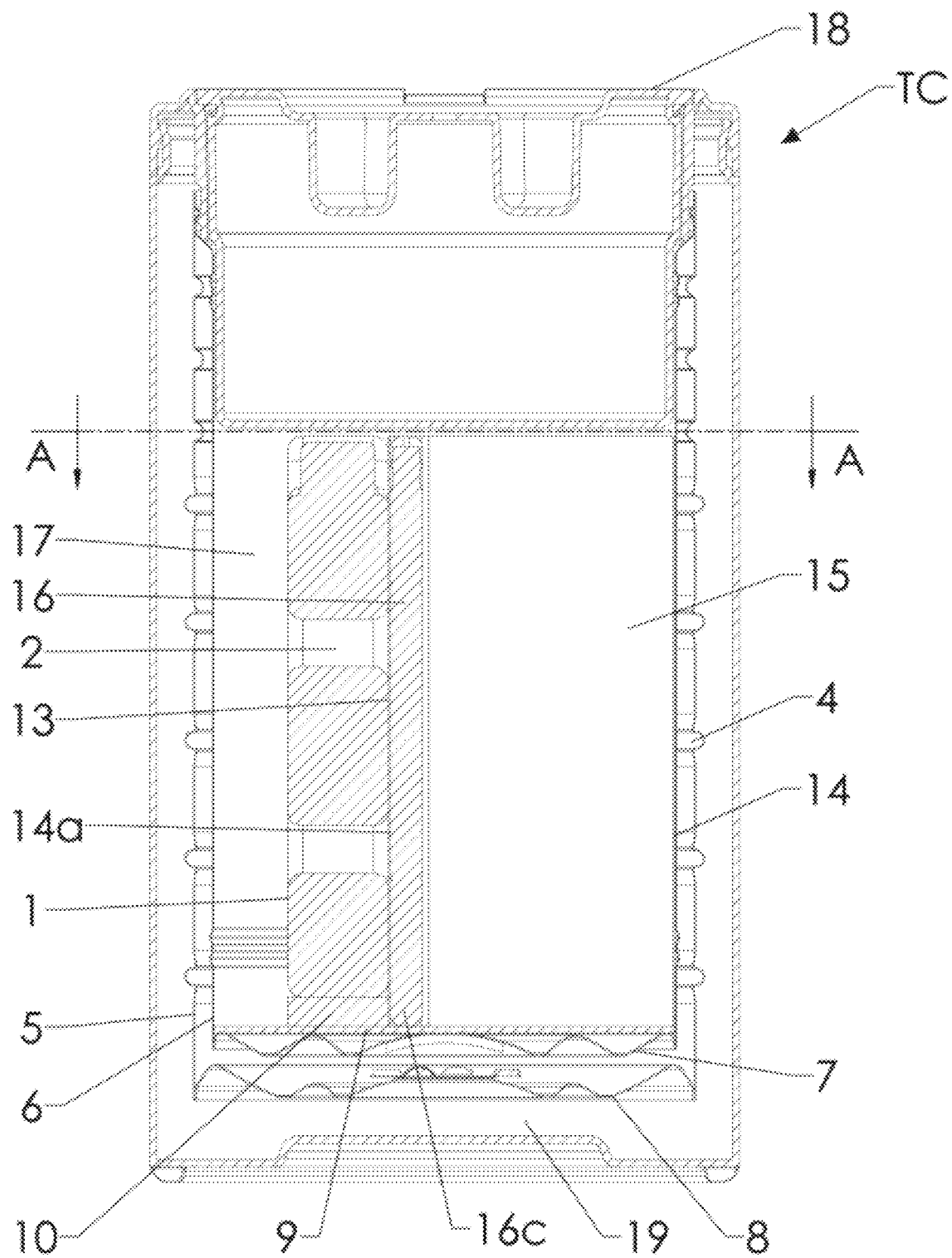
FIG. 3 is a schematic cross-sectional view of the transport container of FIG. 2 taken substantially along line B-B of FIG. 2.

FIGS. 2 and 3 show the exemplary transport container TC using only one ice battery 1.

The ice battery 1 is located in a cylindrical vacuum can 4, the cylinder jacket of which is essentially formed from an outer jacket 5 and an inner jacket 6. The inner jacket 6 has a diameter of about 157 mm. Diameters that differ from this may be used to allow the usable volume to be adapted to any desired size. The outer jacket 5 can have bead features (not shown) in order to increase the strength and stability of the vacuum can 4. Circular and curved bottom floor panels 7, 8 form the bottom of the vacuum can 4. Compared to containers insulated by means of foam, vacuum vessels with this construction have a significantly better insulating effect.

In the interior of the vacuum can 4, the ice battery 1 can be seen on an insulating plate 10, which in turn rests on a flat plate 9. The flat plate 9 compensates for the unevenness of the bottom floor panel 7. This unevenness is due to the manufacturing process, in order to give the vacuum structure in the floor area more rigidity with less material thickness. Two longitudinal edges 11 and 12 of the ice battery 1 touch the inner jacket 6 (see FIG. 2) and an inward side surface 13 of the ice battery touches an outward side of a flat heat-conducting liner wall portion 14a of a heat-conducting liner 14. The flat heat-conducting liner portion 14a is positioned between the cold storage volume 17 and the usable volume 15. The heat-conducting liner 14 further includes a cylindrical heat-conducting liner wall portion 14b that is located adjacent to the inner jacket 6 of the vacuum can 4 and extends about the usable volume 15 between the left and right edges of the flat heat-conducting liner portion 14a. The left ends of the flat heat-conducting liner wall portion 14a and the cylindrical heat-conducting liner wall portion 14b are defined by a left end bend 14c in the heat-conducting liner 14, and the right ends of the flat heat-conducting liner wall portion 14a and the cylindrical heat-conducting liner wall portion 14b are defined by a right end bend 14d in the heat-conducting liner.

A PCM container 16 is positioned within the usable volume 15 and has an outward wall portion 17a positioned immediately adjacent to the flat heat-conducting liner wall portion 14a and in the preferred embodiment is glued thereto. The usable volume 15 is thus bordered by the cylindrical heat-conducting liner wall portion 14b and by an inner wall portion 17b of the PCM container 16. The PCM container 16 extends laterally outward between left and right ends 16a and 16b, respectively, that are positioned adjacent to the left and right end 14c and 14d bends, respectively, of the heat-conducting liner 14, and thus extends laterally outward beyond the left and right side walls of the ice battery 1. In a bottom area 16c, the PCM container 16 protrudes below the bottom edge of the ice battery 1. The insulating plate 10 allows the ice battery 1 to stand approximately 10 mm above the flat plate 9. In an experiment, these expansions 16a, 16b, 16c of the PCM container 16, which are expanded on three sides compared to the dimensioning of the ice battery 1, result in a very homogeneous temperature distribution in the usable volume 15.

In the exemplary transport container TC, the PCM container 16 contains 150 g of PCM with a heat of conversion of 238 kJ/kg. An absorbent fleece (not shown) distributes the liquid PCM homogeneously over the entire contact surface to the heat-conducting liner 14. The PCM container 16 has container walls made of plastic. It can advantageously be under a slight negative pressure. In this case, the outer walls always press against the fleece and help to perfectly distribute the liquid PCM and thus to optimally transfer the conversion heat to the heat-conducting liner 14 or to absorb heat from it.

In the exemplary transport container TC, the heat-conducting liner 14 consists of a one-piece aluminum sheet with a thickness of 0.7 mm. The flat border area between the ice battery 1 and the PCM container 16 has a height of 200 mm and a chord width of 143 mm. The two aluminum wings of the heat-conducting profile 14 along the inner jacket 6 are bent and rounded along the cylinder walls. In operation, it can be seen that the aluminum sheet along the wings shows a spring force due to production, which presses the entire heat-conducting liner 14 lightly onto the set ice battery 1. A very welcome effect for placing a dented or uneven ice battery 1 more easily in the cold storage volume 17 and pulling it out again. A used ice battery 1 is removable from the cold storage volume 17. The resilient restoring force of the heat-conducting liner 14 also helps.

The vacuum can 4 can contain a radiation shield made of a thin layer of copper (not shown) inserted into the vacuum space 4 in order to minimize heat transfer via radiation between the inside of the vacuum vessel and the external environment. The layer of copper can be either a separate copper sheet or a copper layer chemically or mechanically bonded to the inner wall inside the vacuum area. Additionally inserted getters (not shown) keep the vacuum very low for years.

A lid 18 made of polypropylene foam is placed over the upper end of the vacuum can 4. This extra thick insulating layer helps to supplement the very good insulating effect of the vacuum can 4. A foam layer 19 is also applied around the lower area of the vacuum can 4. The foam layer protects the vacuum can 4 from external mechanical damage. The vacuum can 4 can be protected from external mechanical damage by means of foam, fiberglass, Kevlar, plastic, textiles, canvas, or other materials which cushion an impact. In an experiment, very low heat losses of only 1.3 watts with a temperature difference of 38° C. (outside 43° C. and inside 5° C.) are measured. Together with the unexpectedly good heat distribution between the usable volume 15 and the ice battery 1, the exemplary transport container TC compares positively to the prior art in all technical matters. Thus, with just a single ice battery 1, a longer cold lifetime and a significantly shorter cool-down time are measured. The total volume and the total weight are also reduced significantly. The weight is less than 3 kg and the total external volume of the exemplary transport container TC is reduced to just under 13 liters with a usable volume of approximately 2 liters. This is an unprecedented ratio.

Figure 4:
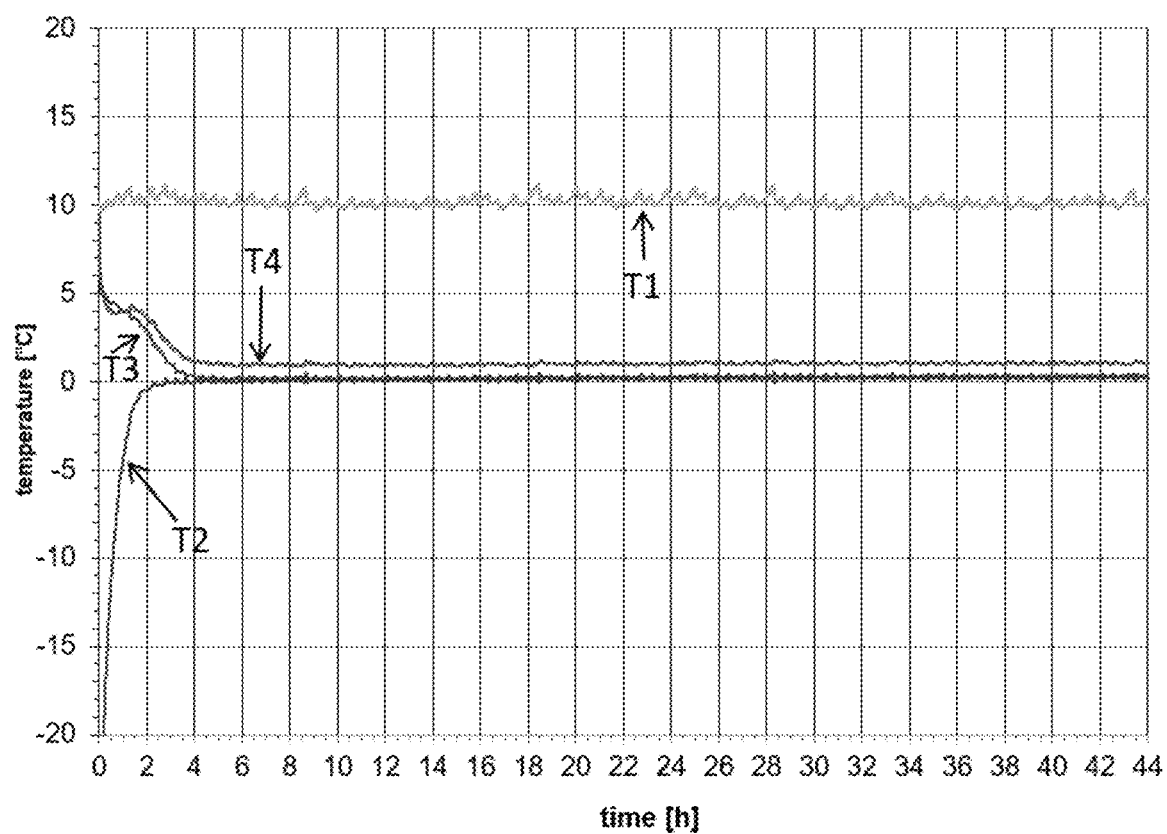
FIG. 4 is a cooling curve of the transport container of FIG. 2 for an ambient temperature of 10° C.

FIG. 4 shows a cooling curve of the exemplary transport container TC from an ambient temperature T1 of only 10° C. After setting one ice battery with a temperature, which has been pre-cooled to −29° C., the usable temperature initially drops just below the transition point of the PCM. Only when the ice battery 1 has heated itself to 0° C. after about 3 hours (see temperature curve T2), the PCM has also completely solidified. The temperature in the usable volume 15 then continues to decrease, but remains above the freezing point 0° C. The temperature curve T3 shows the profile of the temperatures in the usable volume at the coldest point in the bottom area 16c of the PCM container 16, while the temperature curve T4 shows the warmest point below the lid 18. All other areas of the usable volume 15 are between these maximum and minimum temperatures at all times.

Figure 5:
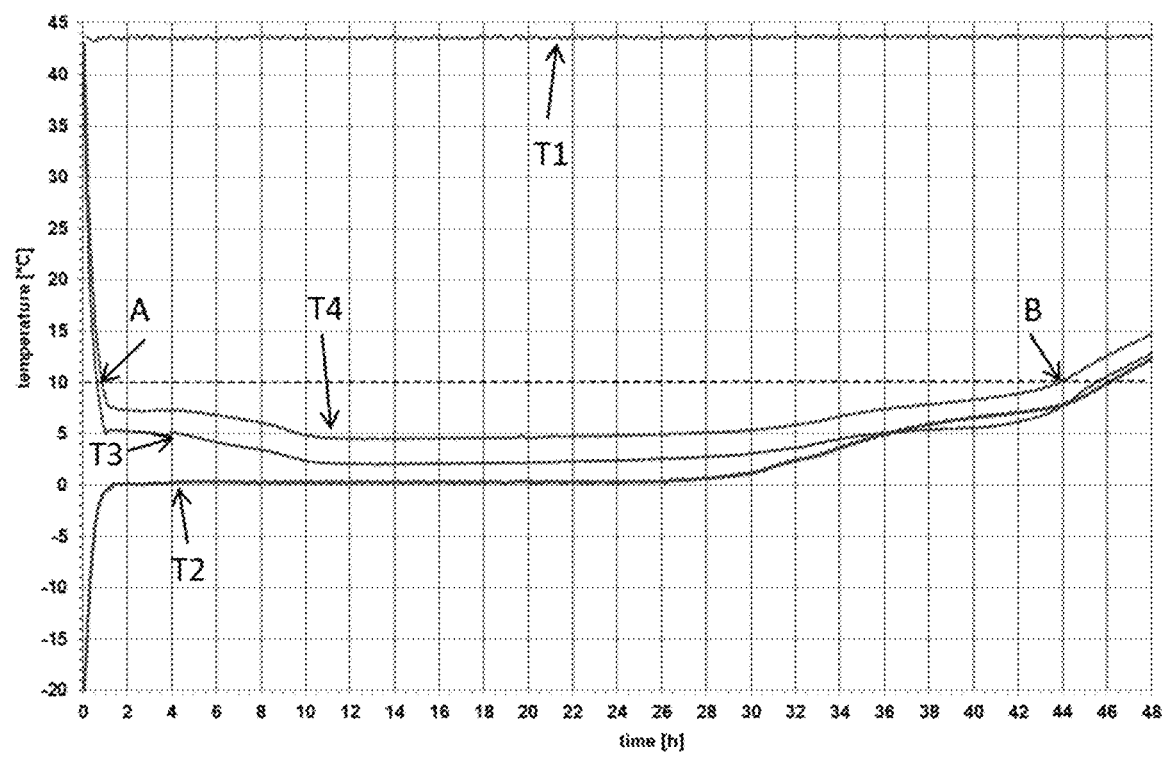
FIG. 5 is a cooling curve of the transport container of FIG. 2 for an ambient temperature of 43° C.

FIG. 5 shows an extreme case where the starting temperatures of the PCM container 16 and the usable volume 15 are 43° C. The ambient temperature T1 remains at 43° C. during the entire cooling period in accordance with the test requirements. Here, too, a frozen ice battery 1 (see temperature curve T2) at −29° C. is inserted into the cold storage volume at the start time. All temperatures drop immediately until after approximately 50 minutes the temperature at the warmest measuring point T4 in usable volume 15 has dropped below the required 10° C. line (see arrow A). As in FIG. 4, the temperature curve T3 shows the lowest temperatures in the entire usable volume 15. Conventional insulating boxes/transport containers need about 2 hours to cool down to 10° C. The advantage of the heat-conducting liner 14, which dissipates the heat from the usable volume 15 directly to the ice battery 1, is again evident even at high starting temperatures. Only the large-area and homogeneously docked PCM prevents an unauthorized drop in the usable volume temperature below the freezing point. In the further course of the ice battery temperatures (see temperature curve T2), it can be seen that the ice battery 1 initially melts completely and then becomes warmer until the PCM container finally takes up its heat of fusion again (from around hour 30). The heat-conducting liner 14 collects the heat from the usable volume 15 via the aluminum wings of the heat-conducting liner 14. Even at these extreme outside temperatures, the inside temperatures are in a very narrow band between T3 and T4. T3 is again the measuring point at the coldest point in the bottom area of the PCM container 16c, while T4, as in FIG. 4, shows the temperature profile of the warmest areas under the cover 18. Finally, arrow B marks the point in time at which the warmest areas exceed the limit temperature of 10° C. In this experiment, the measured cooling time is 44 hours. This, too, marks an unprecedented value for conventional "Freeze Free" transport containers.

Another decisive advantage of the exemplary transport container TC is evident in large-scale operations in which a large number of transport containers are in use at the same time. In relation to the existing freezers, at least 3 to 4 times the number of exemplary transport containers can now be cooled or, with a given number of exemplary transport containers, significantly fewer freezers can be used.

It will be appreciated that the present invention may be practiced in thermally insulated transport containers having larger usable volume, such as ones using multiple cold storage volumes, multiple ice batteries, or multiple PCM containers. A preferred embodiment of the invention in a thermally insulated transport container having a larger usable volume is a substantially rectangular usable volume where multiple ice batteries are placed in multiple cold storage volumes around the usable volume, and multiple PCM containers are placed adjacent to the heat-conducting liner that extends at least partially around the usable volume.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A thermally insulated transport container for use with an ice battery, comprising:
   an internal usable volume for freeze-free cooling of temperature-sensitive products placed therein, the usable volume having an outward usable volume portion;
   an internal cold storage volume sized to receive the ice battery, the cold storage volume having an inward cold storage volume portion adjacent to the outward usable volume portion to define a common interface of the outward usable volume portion and the inward cold storage volume portion, the common interface extending only partially about the usable volume, the cold storage volume being nonconcentrically arranged with respect to the usable volume and extending only partially about the usable volume, the usable volume being separate from and not positioned within the cold storage volume;
   a heat-conducting liner extending at least partially about the usable volume and having a heat-conducting liner portion located at the common interface between the outward usable volume portion and the inward cold storage volume portion through which heat may flow from the usable volume to the cold storage volume; and
   a phase change material (PCM) container positioned adjacent to the heat-conducting liner portion at the common interface and in heat-conducting contact with the heat-conducting liner portion, the PCM container being nonconcentrically arranged with respect to the usable volume and extending only partially about the usable volume, the PCM container being separate from and not positioned within the cold storage volume, the PCM container sized to contain a phase change material, such that the heat of conversion from the PCM serves to compensate for sensible heat below the freezing point of the ice battery within the cold storage volume.

2. The transport container according to claim 1, wherein the thermally insulated transport container is a cylindrically shaped vacuum-insulated container.

3. The transport container according to claim 2, wherein the vacuum-insulated container contains a radiation shield made of copper inside a vacuum area of the vacuum-insulated container.

4. The transport container according to claim 2, wherein the heat-conducting liner portion located between the outward usable volume portion and the inward cold storage volume portion is flat without bends along its entire surface area coextensive with the PCM container.

5. The transport container according to claim 1, wherein the heat-conducting liner is formed from aluminum sheet with a thickness between 0.6 and 1 mm.

6. The transport container according to claim 1, wherein the PCM container is positioned inward of and adjacent to the heat-conducting liner portion at the common interface and is in heat-conducting contact with the heat-conducting liner.

7. The transport container according to claim 1, wherein the phase change material within the PCM container has a melting point between 4 and 6° C.

8. The transport container according to claim 1, wherein the cold storage volume is sized and shaped so that a frozen ice battery can be inserted into the cold storage volume and at least one of the ice battery surfaces is in thermal contact with the heat-conducting liner.

9. The transport container according to claim 1, wherein, a lower area of the cold storage volume has an insulating plate located between the ice battery and a lower area of the cold storage volume, which slows the transfer of heat from the usable volume to the ice battery.

10. The transport container according to claim 2, wherein the vacuum-insulated container has cushioning located adjacent to outer walls of the vacuum-insulated container to protect against mechanical deformation thereof.

11. The transport container according to claim 1, wherein the cold storage volume is sized to receive the ice battery having an internal volume of 0.3, 0.4, or 0.6 liters.

12. The transport container according to claim 1, wherein the usable volume has a volume of 0.5 to 4 liters.

13. The transport container according to claim 1, wherein the phase change material has a heat of fusion between 150 and 300 kJ I kg.

14. The transport container according to claim 1, wherein for every 1.0 kg of water in the ice battery positioned in the cold storage volume, a phase change material with at least a mass of 0.25 kg is placed in the PCM container, provided that the heat of transformation is between 200 and 250 KJ/kg.

15. The transport container according to claim 1, wherein the PCM container contains a sponge or an absorbent fleece for homogeneous distribution of the phase change material adjacent to inward surfaces of the PCM container.

16. The transport container according to claim 1, wherein the heat-conducting liner surrounds the PCM container.

17. The transport container according to claim 1, wherein the PCM container is under a negative pressure.

18. A thermally insulated transport container for use with an ice battery, comprising:

an internal usable volume for freeze-free cooling of temperature-sensitive products placed therein, the usable volume having an outward usable volume portion;

an internal cold storage volume sized to receive the ice battery, the cold storage volume having an inward cold storage volume portion adjacent to the outward usable volume portion to define a common interface of the outward usable volume portion and the inward cold storage volume portion, the common interface extending only partially about the usable volume, the usable volume being separate from and not positioned within the cold storage volume;

a heat-conducting liner extending at least partially about the usable volume and having a heat-conducting liner portion located at the common interface between the outward usable volume portion and the inward cold storage volume portion through which heat may flow from the usable volume to the cold storage volume; and a phase change material (PCM) container positioned adjacent to the heat-conducting liner portion at the common interface and in heat-conducting contact with the heat-conducting liner portion, the PCM container being separate from and not positioned within the cold storage volume, the PCM container sized to contain a phase change material, such that the heat of conversion from the PCM serves to compensate for sensible heat below the freezing point of the ice battery within the cold storage volume.

19. A thermally insulated transport container for use with an ice battery, comprising:

an internal usable volume for freeze-free cooling of temperature-sensitive products placed therein, the usable volume having an outward usable volume portion;

an internal cold storage volume sized to receive the ice battery, the cold storage volume having an inward cold storage volume portion adjacent to the outward usable volume portion to define a common interface of the outward usable volume portion and the inward cold storage volume portion, the common interface extending only partially about the usable volume, the cold storage volume being nonconcentrically arranged with respect to the usable volume and extending only partially about the usable volume;

a heat-conducting liner extending at least partially about the usable volume and having a heat-conducting liner portion located at the common interface between the outward usable volume portion and the inward cold storage volume portion through which heat may flow from the usable volume to the cold storage volume; and a phase change material (PCM) container positioned adjacent to the heat-conducting liner portion at the common interface and in heat-conducting contact with the heat-conducting liner portion, the PCM container being nonconcentrically arranged with respect to the usable volume and extending only partially about the usable volume, the PCM container sized to contain a phase change material, such that the heat of conversion from the PCM serves to compensate for sensible heat below the freezing point of the ice battery within the cold storage volume.

* * * * *